Feb. 11, 1969
E. C. LOWE
3,427,034
DYNAMIC SHAFT SEAL
Filed Sept. 21, 1964
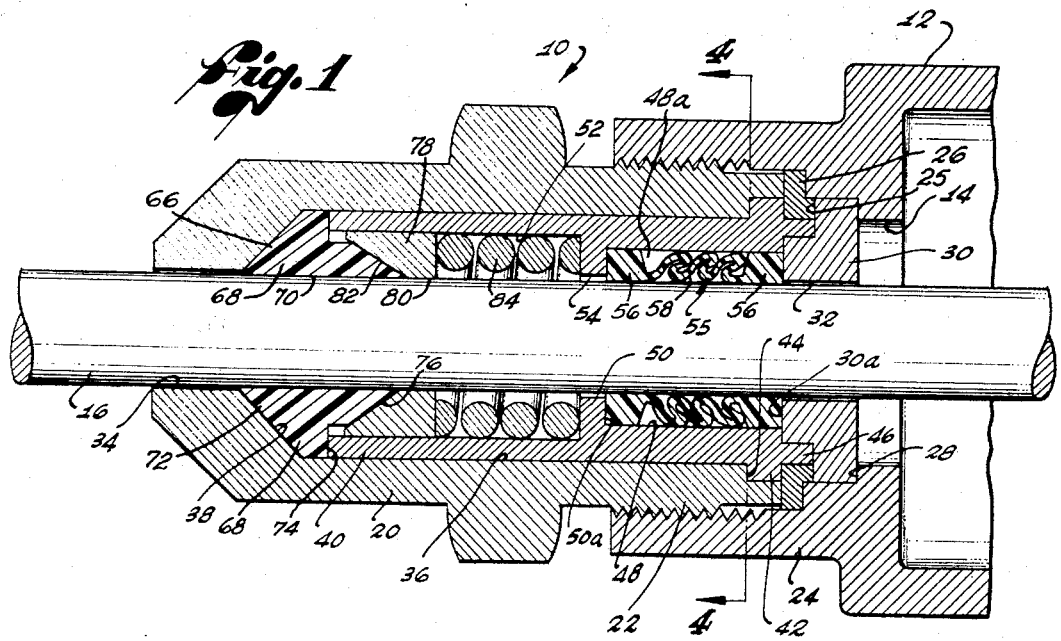
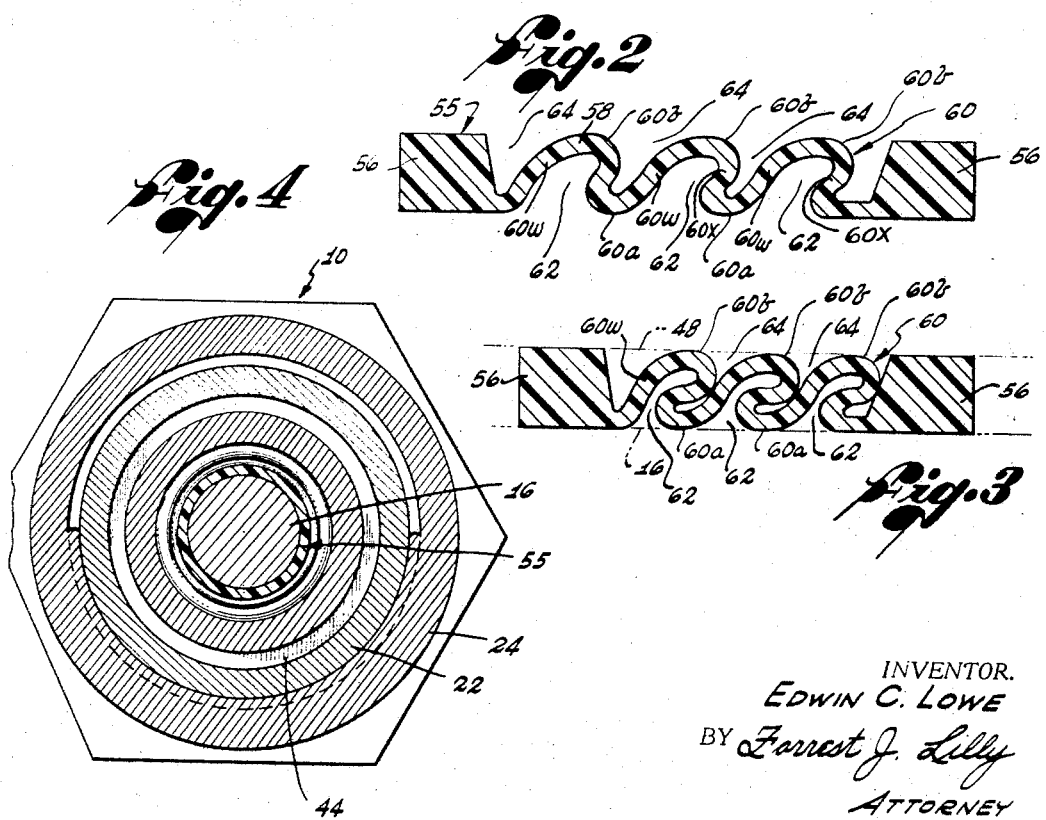
INVENTOR.
EDWIN C. LOWE
BY Forrest J. Lilly
ATTORNEY

United States Patent Office 3,427,034
Patented Feb. 11, 1969

3,427,034
DYNAMIC SHAFT SEAL
Edwin C. Lowe, Van Nuys, Calif., assignor to Robbins Aviation, Inc., Vernon, Calif., a corporation of California
Filed Sept. 21, 1964, Ser. No. 397,837
U.S. Cl. 277—200            6 Claims
Int. Cl. F16j *15/00, 9/20;* F16l *19/00*

This invention relates generally to fluid seals and, more particularly, to an improved dynamic shaft seal.

It has long been a problem to provide an effective fluid-tight seal between the wall of a hermetic enclosure and a movable shaft which extends through an opening in the wall. This problem is encountered in many present day devices, one example of which is valves wherein it is necessary to seal the valve stem to the valve body. This basic problem is rendered more difficult by the current trends in industrial expansion and technological progress which place even more stringent demands on dynamic shaft seals. Modern dynamic shaft seals, for example, are required to withstand extreme pressures and to be effective to limit fluid leakage to an extremely low value or entirely prevent such leakage. In addition, modern dynamic shaft seals are required to remain effective under widely differing environmental conditions, such as, for instance, under world-wide temperature conditions which may range between −65° F. and +165° F.

A general object of the present invention is to provide an improved dynamic shaft seal which is capable of satisfying these stringent demands.

A more specific object of the invention is to provide an improved dynamic shaft seal which is effective to reduce fluid leakage to an absolute minimum, or entirely prevent fluid leakage, even when installed in high pressure fluid systems.

Yet a further object of the invention is to provide a dynamic shaft seal of the character described which is relatively simple in construction, economical to manufacture, and otherwise ideally suited to its intended purposes.

Other objects, advantages, and features of the invention will become readily apparent to those skilled in the art as the description proceeds.

Briefly, the objects of the invention are attained by providing a dynamic shaft seal equipped with a housing which may be attached to or integrally formed with the wall of the enclosure to be sealed and has a central opening through which the shaft is adapted to pass. Within the seal housing is a coaxial, cylindrical seal cavity containing a sleeve-like sealing element of unique construction. This sealing element is constructed preferably of polytetrafluoroethylene, a plastics material known by its trademark Teflon, and characterized by a number of features useful in the invention, such as a low coefficient of friction, and substantial elasticity. The sealing element is formed with end rings or collars integrally joined by a circumferentially corrugated wall, which wall is elastically flexible and therefore longitudinally compressible in the longitudinal or axial direction. The end rings and corrugations have outwardly presented outer sealing surfaces and inwardly presented inner sealing surfaces.

When the sealing element is installed in the seal cavity of the seal housing, the outer sealing surfaces on the element are disposed in fluid-sealing relation to the wall of the cavity and the inner sealing surfaces are disposed in fluid-sealing relation to the surface of the shaft. The normal length of the sealing element is somewhat greater than the axial spacing between the end wall surfaces of the seal cavity, whereby when the sealing element is installed in the seal cavity, the element is axially compressed in a way which causes the corrugations of the element to expand both radially outward and radially inward into effective fluid-sealing relation to the wall of the cavity and the surface of the shaft. Fluid pressure acting on the high pressure end of the sealing element further compresses the element, thereby forcing the corrugations into even more effective fluid sealing relation to the cavity wall and the shaft. Also, in this crowding action, the inclined corrugation walls are forced into positions more normal to the shaft, and thus the corrugations are actually rotated and jammed into tighter bearing engagement with the shaft and cavity walls.

A better understanding of the invention may be had from the following detailed description of a presently preferred embodiment thereof, taken in connection with the annexed drawing, wherein:

FIG. 1 is an axial section through a shaft sealing device according to the invention;

FIG. 2 is an enlarged axial fragmentary section through a flexible sealing element embodied in the sealing device of FIG. 1;

FIG. 3 illustrates the sealing element of FIG. 2 in the axially compressed condition it occupies when installed in the sealing device of FIG. 1; and FIG. 4 is a section taken along line 4—4 in FIG. 1.

The improved dynamic shaft seal of this invention may be used in various types of overall shaft sealing devices. The present improved seal, however, is particularly useful in the dynamic shaft sealing device disclosed in my copending application Ser. No. 397,793 filed Sept. 21, 1964, and entitled Dynamic Shaft Sealing Device and Bushing Therefor which is uniquely constructed to be effective in any part of the world and, thereby, to be effective throughout the wide range of temperatures encountered in different parts of the world. My prior sealing device, for example, is designed to maintain its fluid-tight integrity throughout a temperature range on the order of between −65° F. and +165° F. As explained in my copending application, one of the primary problems encountered in the design of an effective dynamic shaft sealing device for such a wide temperature range involves supporting the shaft in such a way as to prevent excessive lateral displacement of the shaft and accurately maintain the shaft in coaxial alignment with the sealing element, throughout the temperature range. This is necessary in order to avoid fluid leakage which tends to occur, at low temperatures, in conventional dynamic shaft sealing devices designed for operation over a wide temperature range, as explained in my copending application. According to the invention disclosed in my latter application, the shaft is supported by a temperature compensated bushing which acts to positively retain the shaft in coaxial alignment with the fluid sealing element throughout the entire design temperature range.

It should be understood at the outset, however, that while the present improved dynamic shaft seal is particularly useful in the shaft sealing device of my copending application, the present seal is not limited in usefulness to my prior sealing device nor to use in sealing a shaft which is supported by a temperature compensated bushing.

With this preliminary discussion in mind, we proceed with a detailed description of the present improved shaft seal illustrated in the attached drawing.

In this drawing, there is illustrated a dynamic shaft sealing device 10 like that disclosed in my copending application. This sealing device is useful to provide a shaft seal for a hermetic enclosure 12 having an opening 14 through which extends a movable shaft 16. The sealing device 10 will accommodate both axial and rotary motion of the shaft 16 as well as simultaneous axial and rotary motion of the shaft. The present shaft sealing device is ideally suited for use, for example, in a valve wherein the enclosure 12 is the valve body and shaft 16 is the valve stem.

Sealing device 10 comprises an outer sleeve-like body or housing 20 which surrounds the shaft 16, externally of the enclosure 12, and is secured to the latter in any convenient way. In the drawing, for example, the seal housing 20 has an end 22 threadedly engaged in an annular coupling flange 24 on the enclosure 12, about the opening 14. Positioned between the seal housing 20 and a shoulder 25 on the enclosure 12, about the shaft opening 14, is a static seal ring 26 whose function is to provide a fluid-tight joint between the housing and enclosure. Confined between the seal ring 26 and an internal annular shoulder 28 on the enclosure 12 is a disc-like retainer 30 having a central bore 32 through which the shaft 16 passes. The diameter of the bore 32 is sufficiently larger than the diameter of the shaft 16 to provide a slight clearance between the shaft and retainer throughout the temperature range over which the sealing device 10 is intended to operate.

In the outer end of the seal housing 20 is a bore 34 through which the shaft 16 extends to the exterior of the latter housing. The diameter of the bore 34 is sufficiently larger than the diameter of the shaft 16 to provide a slight clearance between the shaft and the wall of the bore throughout the entire temperature range over which the sealing device 10 is to operate.

Within the seal housing 20 is a cylindrical cavity 36 which opens through the inner, or right-hand, end of the housing, as the latter is viewed in FIG. 1. The outer, or left-hand, end of the cavity 36 terminates at a conically tapered end wall surface 38 on the seal housing 20, about the shaft bore 34.

Slidably received within the cavity 36 in the seal housing 20 is a sleeve 40. At the right-hand end of the sleeve 40 is an external annular shoulder 42 which engages in an internal annular groove 44 in the right-hand end of the seal housing 20 to axially position the sleeve 40 relative to the housing 20. Sleeve 40 is shown to have an axially extending, annular flange 46 over which the static seal ring 26 fits and which, in turn, fits over a reduced diameter shoulder portion on the retainer 30.

Extending axially into the inner, or right-hand, end of the sleeve 40, as the latter is viewed in FIG. 1, is a bore 48 terminating, at its outer end, in an internal annular shoulder 50 within the sleeve. Extending axially into the outer, or left-hand, end of the sleeve 40 is a bore 52. Bore 52 terminates at the sleeve shoulder 50 and communicates with bore 48 through a central bore 54 in the shoulder 50. The diameter of the bore 54 is sufficiently larger than the diameter of the shaft 16 that a slight clearance exists between the shaft and the wall of the bore throughout the entire temperature range over which the sealing device 10 is intended to operate.

Positioned within the annular cavity 48a defined by the shaft 16, the wall of sleeve bore 48, and the confronting surfaces 50a and 30a of sleeve shoulder 50 and retainer 30, respectively, is an improved resilient sealing element 55 according to this invention. This sealing element provides a fluid-tight seal between the movable shaft 16 and the sleeve 40. Sealing element 55 comprises a corrugated sleeve constructed of a relatively stiff though flexible and resilient material having a low coefficient of friction against the shaft 16. A synthetic resin, polytetrafluoroethylene, sold under the trademark Teflon, has been found to be the ideal material for the sealing element. Other suitable materials could conceivably be used. At the ends of the sealing element or sleeve 55 are solid annular shoulders or collars 56 which are connected by an intervening sleeve wall 58 of reduced thickness. This wall is shaped to form a multiplicity of convolutions or corrugations 60 which define inwardly opening cavities 62 and outwardly opening cavities 64. Each corrugation is defined in part by a generally conical wall 60w which is inclined at an acute angle to the common axis of the shaft 16 and sleeve 40, and which functions as a compression beam in the operation of the seal, as will appear later. The corrugations are, more specifically, formed by oppositely reversely-curved wall portions 60w and 60x. This corrugated wall structure can also be described as being substantially bellows-shaped.

FIG. 2 shows the sealing element 55 in the condition in which it exists prior to insertion into the seal cavity 48a. It will be observed that in this initial condition of the sealing element, the inner surfaces of the inwardly directed corrugation loops 60a are substantially flush with the inner cylindrical surfaces of the end shoulders 56 on the element. The outer surfaces of the outwardly directed corrugation loops 60b are substantially flush with the outer cylindrical surfaces of the end shoulders 56. The axial length of the sealing element 55, prior to its insertion into the cavity 48a, is somewhat greater than the axial length of the cavity, i.e., than the spacing between the confronting surfaces 30a and 50a of the retainer 30 and sleeve shoulder 50, which surfaces define the end walls of the seal cavity. The radial thickness of the end shoulders 56 of the sealing element is slightly greater than the radial cross-sectional dimension of the seal cavity, i.e., than the radial clearance between the shaft 16 and the wall of the sleeve bore 48.

When sealing element is installed in the seal cavity 48a, the outer cylindrical surfaces of the end shoulders or collars 56 of the element and the outer surfaces of the outwardly directed corrugation loops 60b engage the outer wall of the cavity. The inner surfaces of the shoulders 56 and the inner surfaces of the inwardly directed corrugation loops 60a bear on the shaft 16. Owing to the fact that the initial or unstressed length of the sealing element 55 is greater than the axial length of the seal cavity 48a, the element is axially compressed when installed in the cavity. This axial compression of the element crowds the corrugation loops 60a and 60b together. Additional axial compression of the sealing element and crowding of the corrugations occur when the element is exposed to fluid pressure in the enclosure 12. This fluid pressure acts on the right-hand or inner end face of the sealing element 55 and urges the right-hand seal shoulder 56 outwardly, or to the left, toward the left-hand shoulder 56.

It is apparent from FIGS. 3 and 4 that owing to the inherent bending stiffness of the material from which the sealing element 55 is constructed, axial compression of the element, occasioned by initial installation of the element in the seal cavity 48a and by the subsequent action of fluid pressure on the inner end of the element, creates a left-hand or outwardly directed force on the outer circumference of each corrugation wall 60w and a right-hand or inwardly directed force on the inner circumference of each corrugation wall 60w. In other words, axial compression of the sealing element creates on each radial section of each corrugation wall 60w a force couple which tends to rotate the respective wall section toward a plane normal to the shaft 16. As a consequence, each wall 60w tends to assume a position more normal to the shaft and is thereby wedged or jammed more tightly between the shaft and the outer wall of the seal cavity 48a. This wedging or jamming action, in turn, places each corrugation wall under increased radial compression. In still more particular, consider a corrugation wall 60w, such as typically the second wall 60w from the left in FIG. 2, and note that this S-shaped or reversely curved wall, at the point or region where it merges into the convex loop 60a, is in tangential engagement with the shaft; and that as the wall 60w is slightly rotated in the left-hand direction, upon axial compression of the corrugations, the loop 60a acts like a cam bearing against the shaft, and so increases the bearing pressure against the latter. At the same time, the convex loop 60b at the top of the wall 60w moves somewhat towards the left as wall 60w assumes a more upright position. The slightly S-shaped wall 60b, functioning as a compression beam, is thus compressed more tightly between the shaft and seal cavity surface at the same time buckling limitedly to accommodate the reduced distance from shaft to seal chamber wall in the more angular compression positions. Thus, in the compressed state (FIG. 3), the S-shaped wall 60w, for the various reasons mentioned earlier, and also because of its increased S-shape deformation, exerts great force against both the shaft and the seal chamber wall, and a uniquely effective fluid seal is thereby achieved.

At this point, therefore, it is apparent that axial compression of the sealing element 55 urges the inner surfaces of the inwardly directed corrugation loops 60a into more intimate or effective sealing contact with the shaft 16 and, concurrently, urges the outer surfaces of the outwardly directed corrugation loops 60b into more intimate or effective sealing contact with the outer wall of the seal cavity 48a. Accordingly, increased axial compression of the sealing element occasioned by increased fluid pressure in the enclosure 12 is effective to increase the sealing efficiency of the shaft sealing element 55. Continued axial compression of the sealing element eventually squeezes the two side walls of each corrugation together, thereby forcing the inner and outer surfaces of the corrugations into even more effective sealing contact with the shaft and seal cavity wall. A sealing element 55 according to this invention has been constructed of Teflon and successfully tested under pressures on the order of 2000 p.s.i. No fluid leakage was observed. The sealing element was on the order of .358 inch in outside diameter and .246 inch in inside diameter at the end shoulders 56, .535 inch in unstressed length, and had a corrugated wall thickness of .020 inch. Shaft 16 was on the order of .247 to .249 inch in diameter. The seal cavity 48a had an outer diameter of .355 inch and a length of .400 inch. Dimensions of these appropriate relative magnitudes are typical and representative of the invention. A unique relationship in the invention is that found between the effective length of the corrugation wall 60w (in the uncompressed state of the seal), from shaft to seal cavity surface, and its thickness. If the wall is relatively too thick for its length, the S-shaped elastic deformation, and the sealing action of the invention, are not achieved; and if relatively too thin for its length, the wall becomes too flexible, and is incapable of developing sufficient sealing force against the shaft and seal cavity wall. Excellent sealing action has been achieved, in the characteristic manner of the invention, using the dimensions given above. Assuming those dimensions, and an approximate inclination of 45° or thereabouts for the walls 60w (see FIG. 2), the ratio in question then becomes something of the order of substantially 4.5 to 1. A ratio on this order of magnitude is characteristic or typical of the invention, and is within its range of effective performance.

As discussed in my aforementioned copending application Ser. No. 397,793, in order to preserve the fluid-tight integrity of a resilient sealing device, such as that described above, over a wide temperature range, say —65° F. to +165° F., it is essential that the shaft be positively restrained against lateral movement relative to the sealing element, and thereby accurately maintained in axial alignment with the element, over the entire temperature range. According to the invention disclosed in my copending application, this restraint of the shaft against lateral movement and retention of the shaft in axial alignment with the sealing element is accomplished by a unique bushing assembly 66. Bushing assembly 66 comprises a bushing 68 proper composed of a resilient, low friction bearing material which preferably comprises the same material as the sealing element 55, to wit, polytetrafluoroethylene, known by its trademark Teflon. Extending through the bushing 68 is a bore 70 through which the shaft 16 passes. The outer end face 72 of the bushing 68 is conically tapered at the same angle as the confronting inner conical surface 38 of the seal housing 20. The inwardly directed end of the bushing 68 is reduced in diameter to form an inwardly presented annular shoulder 74 about the bushing. This shoulder is engaged by the outer end face of the sleeve 40, whereby the bushing 68 is confined between the conical end surface 38 of the seal housing and the outer end face of the sleeve 40. The inwardly directed end of the bushing 68 is conically tapered at 76.

Slidably positioned within the outer bore 52 in the sleeve 40 is a pressure ring 78 having a central bore 80 through which the shaft 16 passes. The diameter of this bore is sufficiently larger than the diameter of the shaft 16 that a slight clearance exists between the shaft and the wall of the bore throughout the entire temperature range over which the sealing device 10 is intended to operate. The side of the pressure ring 78 confronting the bushing 68 is conically bored to provide the ring with a conically tapered surface 82 having the same angle of taper as the conically tapered surface 76 on the bushing. Encircling the shaft 16, within the bore 52 in the sleeve 40, is a compression spring 84 which seats at one end against the sleeve shoulder 50 and at the opposite end against the confronting face of pressure ring 78. Spring 84, therefore, urges the pressure ring 78 against the bushing 68 and, thereby, the bushing against the conically tapered end wall surface 38 of the seal housing 20. The bushing is thus centered in the seal housing 20.

It is further apparent that the bushing 68 is axially compressed between the conically tapered end wall surface 38 on the seal housing 20 and the conically tapered surface 82 on the seal ring 78. The compression forces exerted by the surfaces 38 and 82 on the bushing have components which are directed radially in toward the shaft 16 and serve to radially compress the bushing toward the shaft 16, about the entire circumference of the bushing. The bushing assembly 66, including the bushing 68 proper, the pressure ring 78, and the spring 84, is so designed that the radial compression forces produced on the bushing by the spring 84 retain the bushing in effective supporting contact with the shaft 16 throughout the temperature range over which the dynamic sealing device 10 is intended to operate. Thus, when the sealing device 10 is exposed to increasing temperature, the shaft 16 expands radially, thereby exerting an outward radial force on the bushing 68, about the entire circumference of the shaft. This outward radial force on the bushing causes the latter to expand radially against the conically tapered surface 38 on the seal housing 20 and the conically tapered surface 82 on the pressure ring 78, thereby creating an axial force on the pressure ring 78 in a direction opposing the force of the spring 84 on the pressure ring. The pressure ring thus moves to the right in FIG. 1, against the action of the spring. When the sealing device 10 is exposed to a diminishing temperature, the shaft 16 contracts radially, thereby relieving the radial force exerted on the bushing 68 by the shaft. Under these conditions, the axial force exerted by the spring 84 on the bushing 68 is effective to radially contract the bushing about the shaft 16, as the latter contracts in response to reducing temperature. The mating conical surfaces 38, 72 and 76, 82 on the seal housing, pressure ring and bushing constantly center the bushing in the seal housing. The bushing 68 is thus permitted to expand radially, as the shaft 16 expands radially, under increasing temperature conditions, and the bushing is caused to contract radially, when the shaft 16 contracts radially, under reducing temperature conditions, in such manner that the bushing remains centered in the seal housing 20 and in effective supporting contact with the shaft throughout the temperature range for which the sealing device 10 is designed.

The invention herein described and illustrated is thus fully capable of attaining the several objects and advantages preliminarily set forth. While a presently preferred embodiment of the invention has been disclosed for illustrative purposes, various modifications in the design, arrangement of parts, and instrumentalities of the invention are possible within the spirit and scope of the following claims.

I claim:

1. A pressure fluid sealing means for a shaft in a housing assembly, said assembly including means bored to form, concentrically and annularly spaced around said shaft, a cylindrical seal cavity with a cylindrical wall surface, and including also oppositely facing walls spaced axially of and surrounding said shaft to form end walls for said cylindrical seal cavity, said seal cavity being subject to fluid pressure at a pressurized end thereof, at a point adjacent said shaft, and a seal sleeve composed of an elastic plastics material, of low coefficient of friction, situated in said seal cavity around said shaft and comprising a substantially bellows-shaped corrugated, axially elastically compressible relatively thin central wall section, terminated at each of its two opposite axial ends by concentric cylindrical relatively thick end collars, said sleeve having a longitudinal cylindrical bore continuing through said end collars and said corrugated wall section, said end collars closely fitting said shaft and said corrugated wall section contacting said shaft and said wall surface of said seal cavity, and said seal sleeve being axially elastically compressed between said end walls of said cavity, the wall of said corrugated wall section being formed into alternately outwardly and inwardly directed loops which are inclined toward said pressurized end of said seal cavity, and which bear successively on said cylindrical seal cavity wall surface and said shaft, respectively.

2. The subject matter of claim 1, wherein said plastics material is polytetrafluoroethylene or the mechanical equivalent.

3. The subject matter of claim 1, wherein said inclined loops of said corrugated wall section are comprised of adjoining reversely-curved walls inclined toward said pressurized end of said seal cavity.

4. The subject matter of claim 3, wherein said plastics material is polytetrafluoroethylene or the mechanical equivalent.

5. The subject matter of claim 3, wherein the reversely-curved corrugation wall on that side of a given wall loop that is most remote from said pressurized end of said cavity acts as an inclined compression beam between the point of contact of one end thereof with the shaft, and the point of contact of the other end thereof with the wall surface of the seal cavity, and wherein the effective length-to-thickness ratio of said beam, in the uncompressed state of the seal, is on the order of 4.5 to 1, said plastics material being polytetrafluoroethylene or the mechanical equivalent.

6. A pressure fluid sealing means for a shaft in a body assembly, said assembly including means bored to form, concentrically and annularly spaced around said shaft, a cylindrical seal cavity with a cylindrical sidewall surface, and an end wall for an end of said cylindrical cavity, said cavity being subject to fluid pressure at said end thereof, at a point adjacent said shaft, and a seal sleeve composed of an elastic plastics material, of low coefficient of friction, situated in said seal cavity around said shaft and comprising a relatively thin substantially bellows-shaped corrugated, axially elastically compressible central wall section, terminated at its axial end adjacent said end wall by an end collar slideable longitudinally in the corresponding end portion of said cylindrical seal cavity, and at its opposite axial end by an end collar fixed in position at the opposite axial end of said cylindrical seal cavity, said sleeve having a longitudinal cylindrical bore continuing through said end collars and said corrugated wall section, said end collars closely fitting said shaft and said corrugated wall section contacting said shaft and said cylindrical wall surface of said seal cavity, and said seal sleeve being axially elastically compressed between its said fixed collar and said end wall of said cavity, the wall of said corrugated wall section being formed into alternately outwardly and inwardly directed loops which are inclined toward said pressurized end of said seal cavity, and which bear successively on said cylindrical seal cavity wall surface and said shaft, respectively.

References Cited

UNITED STATES PATENTS

| 2,132,814 | 10/1938 | Wheeler | 277—213 |
| 2,243,439 | 5/1941 | Pranger et al. | 277—31 |

LAVERNE D. GEIGER, *Primary Examiner.*

D. MASSENBERG, *Assistant Examiner.*

U.S. Cl. X.R.

277—213